May 10, 1927.
C. G. STRANDLUND
1,628,372
COMBINED GAUGE WHEEL AND COLTER
Filed April 19, 1921   2 Sheets-Sheet 2
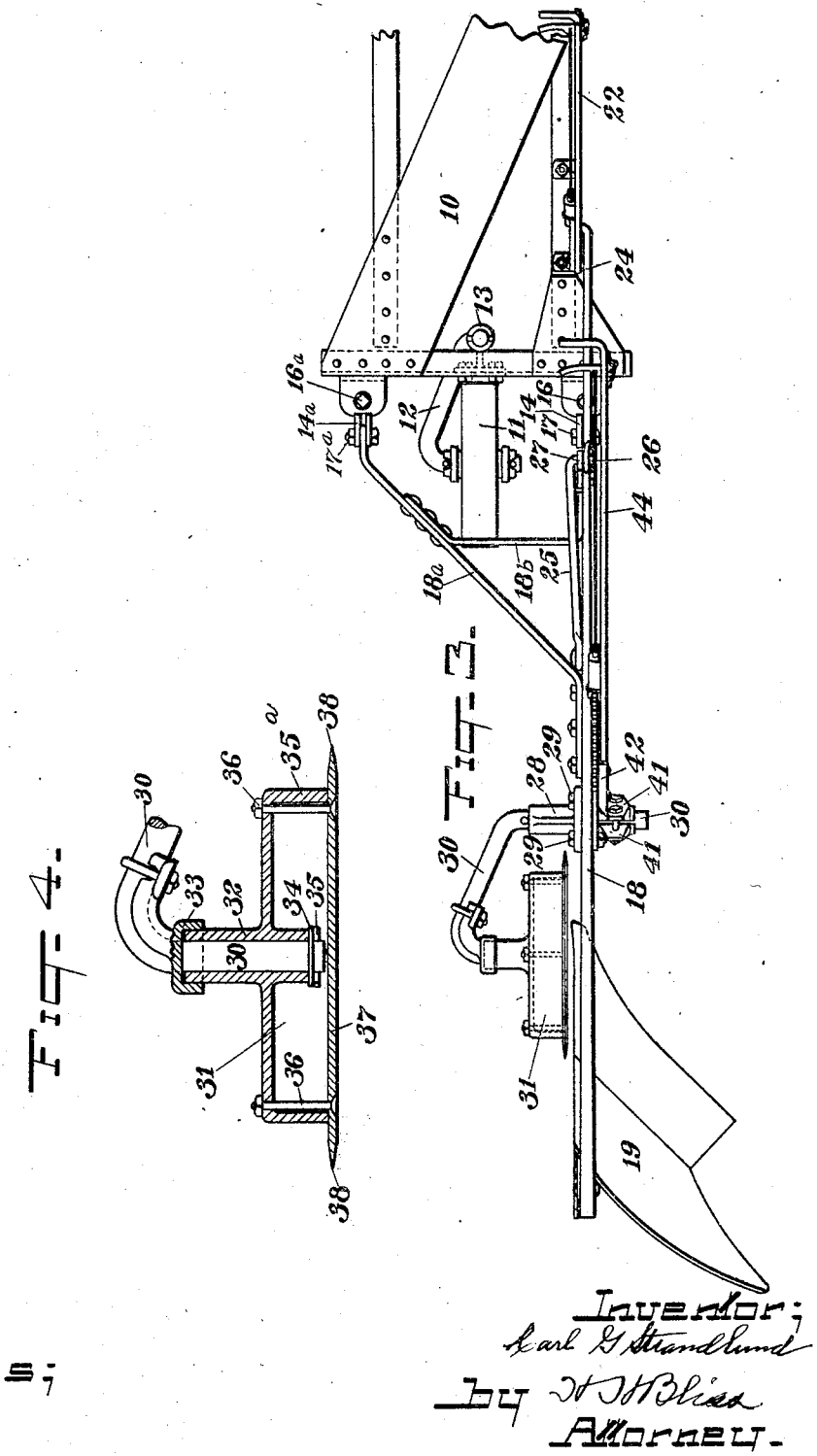

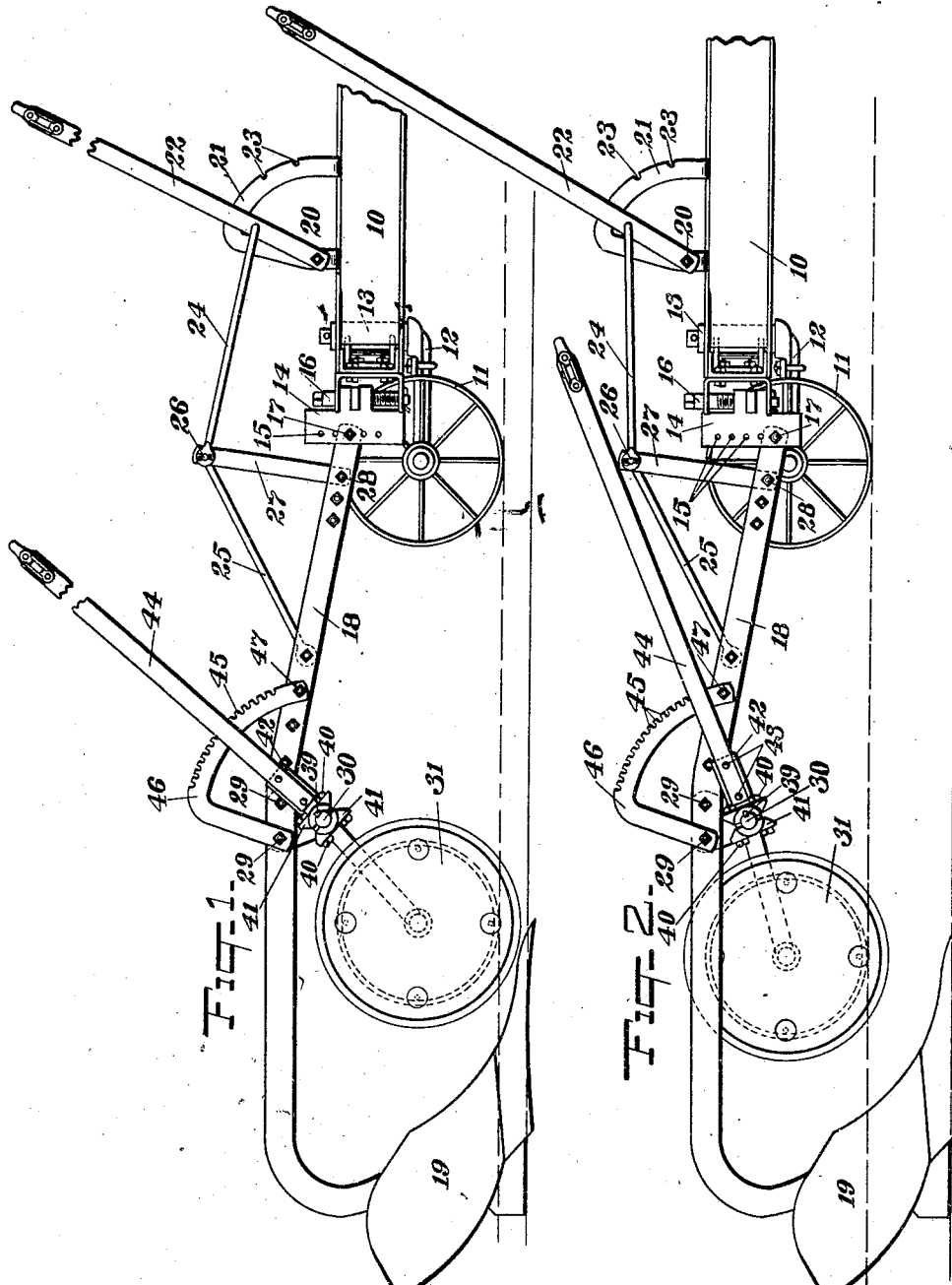

Patented May 10, 1927.                                    1,628,372

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

COMBINED GAUGE WHEEL AND COLTER.

Application filed April 19, 1921. Serial No. 462,619.

This invention relates to plows, and more particularly to that type drawn by a tractor and provided with a combined gauge wheel and colter adjustable to accommodate the varying depths at which the plow may be operated. The objects of my invention will be clearly set forth in the following specification.

Referring to the drawings, in which similar numerals indicate identical parts:

Figure 1 is a side elevation of a plow with the combined gauge wheel and colter in position for shallow plowing.

Figure 2 is a similar view to Figure 1 with the gauge wheel and colter adjusted for deeper plowing.

Figure 3 is a plan view of Figure 2.

Figure 4 is a diametrical section of the gauge wheel and colter.

In the operation of a plow provided with a gauge wheel the depth of plowing is regulated by adjustment of the gauge wheel in various ways well known in the art. Rolling colters have also been employed for the purpose of cutting, in advance of the plow, sod and surface trash to be more readily buried in the furrow as the latter is turned. I have found that the best results are obtained by combining the gauge wheel and the colter so that, by actuation of suitable mechanism, they will move simultaneously to the position desired relative to the plow body. Experiment has determined that this position is, as shown, in close proximity to the plow body where the colter aids as a resistant to side pressure on the plow that might cause the latter to deviate from a straight line. It is also a fact that by placing the colter, as shown, in close proximity to the plow body, the effective operation of the colter in cutting sod and trash is materially aided not only by the "suck" of the plow but by the upward thrust of the earth, displaced by the plow, which tends to hold trash, such as corn stalks and weeds, against the rotary cutting edge of the colter, and this is particularly so in deep plowing, for it will be observed that whereas at approximately sod depth, as shown in Figure 1, the cutting action of the colter is close to the plow point, for deep plowing, as illustrated in Figure 2, the colter and gauge wheel have been adjusted rearwardly, moving in an arc eccentric to the cutting edge of the plow body, to a position productive of the best results.

Part of a draft frame 10 and a supporting wheel 11 is shown, the latter supported on a crank axle having a vertical portion journaled in a bearing 13 mounted on the frame 10. A clevis 14 is mounted on the frame 10 and is vertically adjustable by operation of a screw 16. A plow beam 18 is pivotally attached to the clevis 14 by a bolt 17 and carries a plow body 19. The attachment of the beam 18 to the clevis 14 can be varied vertically, a series of holes 15 being provided in the clevis 14 for that purpose.

A brace 18$^a$ is secured at its rear end to the beam 18 and extends diagonally to connection with a clevis 14$^a$ mounted on the draft frame 10. The clevis 14$^a$ is in lateral alinement with the clevis 14, and is similar in construction with the latter, being provided with a vertically disposed series of holes and an adjusting screw 16$^a$. The brace 18$^a$ is reinforced by a cross bar 18$^b$ secured thereto and to the beam 18. A sector 21 is mounted on the frame 10 and pivotally secured on the sector is a hand lever 22 provided with a latch device adapted to engage with either of the notches 23 in the sector 21. The lever 22 is connected to the beam 18 by rods 24, 25, the former of which is pivotally attached at 26 to a standard 27 mounted at 28 on the beam 18. By a forward actuation of the lever 22 the beam 18 and attached plow body will be raised out of operation, swinging about the pivots 17 and 17$^a$, and held in the desired position by the latch on the lever engaging a notch in the sector 21. It is evident that by releasing the latch, the plow will drop ready for operation.

A casting 28 is secured on the beam 18, intermediate the length thereof, by bolts 29 and includes a bearing for a crank axle 30 carrying upon its lower portion a combined gauge wheel and colter 31 secured in position by a collar 33 and a washer 34 at opposite ends respectively of a hub 32, a pin 35 holds the parts together. The gauge wheel is preferably cast with the hub and has a tread surface 35$^a$ of a desired width. A disk colter 37 is secured to the furrowward side of the gauge wheel by bolts 36, its cutting edge 38 extending beyond the gauge wheel a sufficient distance to ensure efficiency in cutting.

To the end portion of that part of the crank axle supported in the casting 28, and extending furrowward beyond the beam 18, is secured, by bolts 40, a clamp 41 prevented from rotary movement on the axle by a key 39. An arm 42 extends from the clamp 41 and a lever 44 is secured thereto by rivets 43; the lever 44 is provided with a latch adapted to engage with any one of notches 45 in a sector 46 mounted on the beam 18 and fixed thereon by bolts 29 and 47.

Both of the levers 22 and 44 are convenient to an operator on the frame 10, lever 22 operable to raise the plow from the ground irrespective of the position of the gauge wheel and colter, and lever 44 operable to adjust the combined gauge wheel and colter not only to regulate the depth of plowing but to present the colter, relative to the plow body, to cut the sod that may be in its path, in the most effective manner.

What I claim is—

1. In a plow including a beam and a plow body carried thereby, the combination therewith of a crank axle rockably journaled on the beam and having a spindle at its free end, a combined gauge wheel and colter supported on said spindle, a lever secured on the axle and operative to rock said axle and swing the gauge wheel and colter upwardly and rearwardly of the point of the plow body in an arc eccentric to the vertical cutting edge of the plow body.

2. In a plow including a beam and a plow body carried thereby, the combination therewith of a crank axle journaled on the beam forwardly of the point of the plow body, and having a spindle at its free end, a combined gauge wheel and colter supported on said spindle, and a lever operative to rock said axle and swing the gauge wheel and colter in an arc eccentric to the vertical cutting edge of the plow body and rearward of the point of the plow body.

3. In a plow including a beam and a plow body carried thereby, the combination therewith of a crank axle journaled on the beam forwardly of the point of the plow body and having a spindle at its free end, a combined gauge wheel and colter supported on said spindle, a lever operative to rock said axle and swing the gauge wheel and colter upwardly and rearwardly of the point of the plow body in an arc eccentric to the vertical cutting edge of the plow body, and means to hold said gauge wheel and colter at varying points in its arcuate movement.

CARL G. STRANDLUND.